US011531081B2

(12) United States Patent
Wirola et al.

(10) Patent No.: US 11,531,081 B2
(45) Date of Patent: Dec. 20, 2022

(54) ASSISTED POSITIONING FOR INDOOR POSITIONING SERVICES

(71) Applicant: HERE Global B.V., Eindhoven (NL)

(72) Inventors: Lauri Aarne Johannes Wirola, Tampere (FI); Jari Tapani Syrjärinne, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 282 days.

(21) Appl. No.: 16/769,188

(22) PCT Filed: Dec. 7, 2017

(86) PCT No.: PCT/EP2017/081870
§ 371 (c)(1),
(2) Date: Jun. 2, 2020

(87) PCT Pub. No.: WO2019/110110
PCT Pub. Date: Jun. 13, 2019

(65) Prior Publication Data
US 2020/0386848 A1    Dec. 10, 2020

(51) Int. Cl.
*G01S 5/02* (2010.01)
*H04W 4/33* (2018.01)
(Continued)

(52) U.S. Cl.
CPC ............ *G01S 5/02523* (2020.05); *G01S 5/08* (2013.01); *H04W 4/029* (2018.02); *H04W 4/33* (2018.02)

(58) Field of Classification Search
CPC ...... G01S 5/02523; G01S 5/08; H04W 4/029; H04W 4/33; H04W 64/00
See application file for complete search history.

(56) References Cited

U.S. PATENT DOCUMENTS 7,312,752 B2 * 12/2007 Smith .................... H04W 4/33
                                                   342/464
9,485,747 B1    11/2016 Rodoper et al.
(Continued)

FOREIGN PATENT DOCUMENTS

WO    WO 2014/155151 A1    10/2014
WO    WO 2017/000977 A1    1/2017

OTHER PUBLICATIONS

Jeong, J. et al., *SALA: Smartphone-Assisted Localization Algorithm for Positioning Indoor IoT Devices*, Wireless Netw, Springer (2016) 21 pages.
(Continued)

*Primary Examiner* — Hashim S Bhatti
(74) *Attorney, Agent, or Firm* — Alston & Bird LLP

(57) ABSTRACT

Inter-alia, a method is disclosed comprising: receiving one or more beacon signals sent by one or more beacon devices (140-1-140-5); determining one or more identifier information of the one or more beacon devices, wherein the one or more identifier information of the one or more beacon devices are represented by the one or more beacon signals; and broadcasting or triggering broadcasting broadcast information for enabling determining of a position of the at least one first apparatus based at least partially on the determined one or more identifier information of the one or more beacon devices, wherein the broadcast information at least partially comprises or represents the determined one or more identifier information of the one or more beacon devices. It is further disclosed an according apparatus, computer program and system.

18 Claims, 4 Drawing Sheets

(51) Int. Cl.
*H04W 4/029* (2018.01)
*G01S 5/08* (2006.01)

(56) References Cited

U.S. PATENT DOCUMENTS

| | | | |
|---|---|---|---|
| 10,291,055 B1* | 5/2019 | Bell | H02J 50/80 |
| 2015/0105099 A1* | 4/2015 | Luo | H04W 64/00 |
| | | | 455/456.1 |
| 2015/0134383 A1 | 5/2015 | Lee et al. | |
| 2016/0161592 A1 | 6/2016 | Wirola et al. | |
| 2016/0299213 A1* | 10/2016 | Jones | H04W 72/10 |
| 2017/0064667 A1 | 3/2017 | Mycek et al. | |
| 2017/0347228 A1* | 11/2017 | Kerai | G01S 5/0036 |

OTHER PUBLICATIONS

International Search Report and Written Opinion for Application No. PCT/EP2017/081870 dated Aug. 8, 2018, 17 pages.

\* cited by examiner

ASSISTED POSITIONING FOR INDOOR POSITIONING SERVICES

CROSS-REFERENCE TO RELATED APPLICATIONS

This application is a national phase entry of International Application No. PCT/EP2017/081870, filed Dec. 7, 2017, the entire contents of which are incorporated herein by reference.

FIELD

The following disclosure relates to the field of indoor positioning systems, and more particularly relates to systems, apparatuses, and methods for determining a position by an assisted positioning for an indoor positioning service.

BACKGROUND

Indoor positioning requires novel systems and solutions that are specifically developed and deployed for this purpose. The "traditional" positioning technologies, which are mainly used outdoors, for instance satellite and cellular positioning technologies, cannot deliver such performance indoors that would enable seamless and equal navigation experience in both environments.

The required positioning accuracy (within 2 to 3 meters), coverage (~100%) and floor detection are challenging to achieve with satisfactory performance levels with the systems and signals that were not designed and specified for the indoor use cases in the first place. Satellite-based radio navigation signals simply do not penetrate through the walls and roofs for the adequate signal reception and the cellular signals have too narrow bandwidth for accurate ranging by default.

Several indoor-dedicated solutions have already been developed and commercially deployed during the past years, for instance solutions based on pseudolites (Global Positioning System (GPS)-like short-range beacons), ultrasound positioning, Bluetooth Low Energy (BLE) signals (e.g. High-Accuracy Indoor Positioning, HAIP) and Wi-Fi fingerprinting. What is typical to these solutions is that they require either deployment of totally new infrastructure (radio nodes or radio beacons, or tags to name but a few non-limiting examples) or manual exhaustive radio surveying of the buildings including all the floors, spaces and rooms. This is rather expensive and will take a considerable number of time to build the coverage to the commercially expected level, which in some cases narrowed the potential market segment only to very thin customer base, for instance for health care or dedicated enterprise solutions. Also, the diversity of these technologies makes it difficult to build a globally scalable indoor positioning solution, and the integration and testing will become complex if a large number of technologies needs to be supported in the consumer devices (e.g. smartphones).

For an indoor positioning solution to be commercially successful, that is, i) being globally scalable, ii) having low maintenance and deployment costs, and iii) offering acceptable end-user experience, the solution needs to be based on an existing infrastructure in the buildings and on existing capabilities in the consumer devices. This leads to an evident conclusion that the indoor positioning needs to be based on Wi-Fi- and/or Bluetooth (BT)-technologies that are already supported in every smartphone, tablet, laptop and even in the majority of feature phones. It is, thus, required to find a solution that uses the Wi-Fi- and BT-radio signals in such a way that makes it possible to achieve 2 to 3 meter horizontal positioning accuracy, close to 100% floor detection with the ability to quickly build the global coverage for this approach.

Further, a novel approach for radio-based indoor positioning that models for instance the Wi-Fi-radio environment (or any similar radio e.g. Bluetooth) from observed Received Signal Strength (RSS)-measurements as two-dimensional radio maps and is hereby able to capture the dynamics of the indoor radio propagation environment in a compressable and highly accurate way. This makes it possible to achieve unprecedented horizontal positioning accuracy with the Wi-Fi signals only within the coverage of the created radio maps and also gives highly reliable floor detection.

To setup indoor positioning in a building, the radio environment in the building needs to be surveyed. This phase is called radio mapping. In the radio mapping phase samples containing geolocation (like latitude-, longitude-, altitude-; or x-, y-, z-(floor) coordinates) and radio measurements (Wi-Fi and/or Bluetooth radio node identities and signal strengths). Having these samples allows understanding how the radio signals behave in the building. This understanding is called a radio map. The radio map enables localization capability to devices. When they observe varying radio signals, the signals can be compared to the radio map resulting in the location information.

The radio samples for the radio map may be collected with special software tools or crowd-sourced from the user devices. While automated crowd-sourcing can enable indoor localization in large number of buildings, manual data collection using special software tools may be the best option, when the highest accuracy is desired.

Yet another aspect of the modern Bluetooth radio node respectively beacon systems is beacon monitoring and management.

Hubs are deployed throughout the venue so that each beacon can communicate with at least one hub. The hubs, on the other hand, are connected to a monitoring/management server via a gateway hub respectively a gateway device, which is essentially a wired/wireless router. The hubs may be connected to the gateway hub through cable (e.g. Ethernet) or wirelessly (e.g. Wi-Fi, Cellular). The gateway hub may for instance be connected to a beacon monitoring and/or management server.

The beacon monitoring refers to monitoring the beacon characteristics most typically via one-way communications by the hubs. The beacons may e.g. periodically broadcast their battery states, which transmissions are captured by the hubs and further routed to the monitoring/management server for analysis and visualization. The beacon management, on the other hand, refers to being able to perform two-way communication with the hubs and beacons. With a beacon management system e.g. the beacon transmit power can be re-configured remotely or the advertisement message changed, when needed. The server managing/monitoring the hub and/or beacon constellations can be a virtual server operated in a cloud (e.g. AWS, Azure), or it can be also a physical local server constituting a self-hosted, high-security system.

SUMMARY OF SOME EXEMPLARY EMBODIMENTS

Tracking is a term for locating objects in such a way that the object's location information will be disposable at another device. An example related to indoor location is locating car keys in a house. The car keys do not require their location, but it is interesting to another entity, namely to the car owner in this example. However, when talking about small trackers that can be attached to e.g. car keys, there are always two problems:

Battery Life:
Locating such tags is typically based on some radio. While making measurements is quite cheap in terms of energy, sending the measurements to another entity is expensive.

Connectivity:
This relates to the previous bullet point and also to the cost of the tracker. If for example Wi-Fi or Cellular connectivity is required, this is typically very expensive in terms of energy. Also, any radio technologies typically need some authentication or pairing (cellular needs a SIM card, Wi-Fi authentication codes and Bluetooth pairing). The need this can make the solution cumbersome. Also, the need to have a SIM card would generate usage costs and make the tracking tag bigger.

Thus, to keep the energy consumption low, it's better to rely on the simplest possible radios and power-efficient methods of carrying data.

There are such tracking tags available, but they typically require e.g. cellular or Wi-Fi connectivity. Alternatively, a deployment of infrastructure (Bluetooth sniffers or hubs) is needed to capture the measurement messages (typically proprietary).

It is thus, inter alia, an object of the invention to achieve a solution for determining a position in indoor positioning systems of a device that comprises simple hardware without requiring additional hardware or to change existing hardware, e.g. of entities or an infrastructure comprising the entities.

According to a first exemplary aspect of the present invention, a first method is disclosed, performed and/or controlled by at least one first apparatus, the first method comprising:
receiving one or more beacon signals sent by one or more beacon devices;
determining one or more identifier information of the one or more beacon devices, wherein the one or more identifier information of the one or more beacon devices are represented by the one or more beacon signals; and
broadcasting or triggering broadcasting broadcast information for enabling determining of a position of the at least one first apparatus based at least partially on the determined one or more identifier information of the one or more beacon devices, wherein the broadcast information at least partially comprises or represents the determined one or more identifier information of the one or more beacon devices.

This method may for instance be performed and/or controlled by an apparatus, for instance a tag-device. For instance, the method may be performed and/or controlled by using at least one processor of the tag-device.

According to a further exemplary aspect of the invention, a computer program is disclosed, the computer program when executed by a processor causing an apparatus, for instance a tag-device, to perform and/or control the actions of the first method according to the first exemplary aspect of the present invention.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the first method according to the first exemplary aspect of the present invention.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, a first apparatus is disclosed, comprising at least one processor and at least one memory including computer program code, the at least one memory and the computer program code configured to, with the at least one processor, cause an apparatus, for instance the apparatus, at least to perform and/or to control the first method according to the first exemplary aspect of the present invention.

The above-disclosed apparatus according to any aspect of the invention may be a module or a component for a device, for example a chip. The disclosed apparatus according to any aspect of the invention may comprise only the disclosed components, for instance means, processor, memory, or may further comprise one or more additional components.

According to a second exemplary aspect of the present invention, a second method is disclosed, performed and/or controlled by at least one second apparatus, the second method comprising:
obtaining broadcast information for enabling determining of a position of at least one first apparatus, wherein the broadcast information at least partially comprises or represents one or more identifier information of one or more beacon devices, wherein an identifier information enables one of the one or more beacon devices to be identified; and
determining or triggering determining a position of the at least one first apparatus based on the one or more identifier information carried by the obtained broadcast information.

This method may for instance be performed and/or controlled by an apparatus, for instance a server. Alternatively, this method may be performed and/or controlled by more than one apparatus, for instance a server cloud comprising at least two servers. Alternatively, the method may for instance be performed and/or controlled by an electronic device, e.g. a mobile device. For instance, the method may be performed and/or controlled by using at least one processor of the electronic device.

According to a further exemplary aspect of the invention, a computer program is disclosed, the computer program when executed by a processor causing an apparatus, for instance a server, or an electronic device (e.g. a mobile device), to perform and/or control the actions of the second method according to the second exemplary aspect of the present invention.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the second method according to the second exemplary aspect of the present invention.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, a second apparatus is disclosed, comprising at least one processor and at least one memory including computer program code, the at least one memory and the computer program code configured to, with the at least one processor, cause an apparatus, for instance the apparatus, at least to perform and/or to control the second method according to the second exemplary aspect of the present invention.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a third exemplary aspect of the invention, a system is disclosed, comprising:
  at least one first apparatus according to any aspect of the invention as disclosed above, and
  at least one second apparatus according to any aspect of the invention as disclosed above.

In the following, exemplary features and exemplary embodiments of all aspects of the present invention will be described in further detail.

The at least one first apparatus may for instance be a tag-device. Such a tag-device may for instance comprise or be connectable to a transmitter, e.g. according to wireless local area networks (WLAN), to Bluetooth (BT) or to Bluetooth Low Energy (BLE) communication standard. Such a tag-device may for instance broadcast standard signals in order to advertise their presence. In some cases, they may advertise in this way availability to mobile devices seeking a connection, e.g. via broadcasting signals. The signals may convey the broadcast information in the form of packets of pre-defined format, and the broadcast information may include at least an identifier of the tag-device. The tag-device may be visible to any mobile device with suitable radio interface, regardless of whether or not they are known to the mobile device. The broadcasted signals are equally referred to as broadcasted information. Such a tag-device may for instance be of low capability (also referred to as low-capability device), e.g. not comprising or being connectable to a user input device (e.g. keypad, touchpad, or the like to name but a few non-limiting examples), and/or a display, e.g. for displaying information, e.g. to a user.

The one or more beacon devices may for instance be comprised by a venue, e.g. by an infrastructure of the venue. Such a beacon device may for instance be a radio node, e.g. of the venue. Such a beacon device may for instance be used for indoor positioning and/or floor detection, e.g. according to BT- (Bluetooth) and/or BLE- (Bluetooth Low Energy) specification, or may for instance be a Wi-Fi Access Point for indoor positioning and/or floor detection, e.g. according to the WLAN- (Wireless Local Area Network) specification).

Such a beacon device of the one or more beacon devices, e.g. of the venue, may for instance comprise or be connectable to a transceiver, e.g. according to the BT-, BLE, and/or WLAN-specification to provide wireless-based communication. Each beacon device of the one or more beacon devices, e.g. of the venue, may for instance use such a transceiver for transmitting and/or broadcasting one or more beacon signals, e.g. comprising one or more information.

The venue may for instance be a building, shopping mall, office complex, public accessible location (e.g. station, airport, university or the like), to name but a few non-limiting examples.

The one or more beacon signals may for instance be received. Alternatively, the one or more beacon signals may for instance be measured, e.g. by obtaining an identifier information of the beacon device that transmitted the respective beacon signal, and optionally measuring the signal strength of the beacon signal.

An identifier information may for instance enable one of the one or more beacon devices to be identified. The one or more identifier information of the one or more beacon devices may for instance be determined, e.g. by receiving the one or more identifier information from the one or more beacon devices. Additionally or alternatively, the one or more identifier information of the one or more beacon devices may for instance be determined by extracting the one or more identifier information out of the received one or more beacon signals of the one or more beacon devices, e.g. including at least one of the one or more identifier information of the respective beacon device of the one or more beacon devices.

The broadcast information may for instance be broadcasted, e.g. by transmitting the broadcast information via a one-way communication. The broadcasted information may be visible to any (e.g. mobile) device with suitable radio interface, regardless of whether or not the at least one first apparatus broadcasting the broadcast information is known to the second apparatus (e.g. mobile device). In this way, there may for instance be no need for a pairing between the first apparatus and e.g. the device that obtains the broadcasted information, e.g. to the second apparatus. Even without knowing the at least one first apparatus, the device that obtains the broadcasted information may for instance be able to receive the broadcasted information (e.g. the second apparatus). In particular, this may be enabled by broadcasting the broadcast information in predefined format, e.g. according to a wireless communication standard (e.g. BT-, BLE-, or WLAN communication standard) that may for instance be known by the device that obtains the broadcasted information (e.g. the second apparatus).

The broadcasted information enables the determining of the position of the at least one first apparatus based at least partially on the one or more identifier information of the one or more beacon devices that are represented by the broadcasted information. The position of the at least one first apparatus may then for instance be determined by the device that obtained the broadcasted information (e.g. the second apparatus), or the device that obtained the broadcasted information may for instance trigger the determining of the position of the at least one first apparatus, e.g. by requesting the determining of the position from a server.

According to an exemplary embodiment of the first exemplary aspects of the present invention, the first method further comprises:
  determining one or more signal strength values at least partially based on the one or more beacon signals sent by the one or more beacon devices;
  wherein the broadcast information further at least partially comprises or represents the determined one or more signal strength values.

One or more signal strength values may for instance be determined by measuring the one or more signal strength values based on sent beacon signals of the one or more beacon devices. One of the one or more signal strength values may for instance be represented by a received signal strength value (RSS). Such a received signal strength value may for instance represent the power of a received radio positioning support signal (e.g. at the at least one first apparatus), wherein such a radio positioning support signal may for instance be sent (e.g. periodically) from each beacon device of the one or more beacon devices. An example of a received signal strength parameter is a received signal strength indicator (RSSI) or a representation of a physical receiving power level value (e.g. a Rx power level value) in dBm. A signal strength value may for instance represent a signal strength measurement of the observable signal strength at the location of the measurement.

After determining the one or more signal strength values, the broadcast information may for instance be further comprise or represent the determined one or more signal strength values. Thus, the broadcasted information broadcasted comprises or represents the one or more identifier information of the one or more beacon devices and the one or more determined signal strength values.

According to an exemplary embodiment of the first exemplary aspects of the present invention, the broadcast information is contained or represented by a data packet, in particular a Bluetooth advertisement packet. For example, the broadcast information is broadcasted via a Bluetooth advertisement packet.

The at least one first apparatus, respectively the transmitter represented by or connectable to the at least one first apparatus may for instance be configured to broadcast the broadcast information represented by one or more advertising packets using a pre-determined or determined according to pre-defined rules format. Such a pre-determined or determined according to pre-defined rules format may for instance be an advertisement packet, e.g. a BT- or BLE advertisement packet.

The BT advertisement packet may for instance be according to BT-, or BLE-specification. Further, the BT- or BLE advertisement packet may for instance be according to a BT-, or BLE-communication standard of a certain version, e.g. according to BT v4.2, or BT v5.0 to name but a few non-limiting examples.

The BT-, or BLE-specification or the BT-, or BLE communication standard may for instance define such a BT advertisement packet. It may for instance be defined e.g. the size of an header part and/or a payload information part of such an advertisement packet (e.g. BT-, or BLE-advertisement packet).

According to an exemplary embodiment of the first exemplary aspect of the present invention, the broadcast information is broadcasted in the form of a radio signal, in particular a Bluetooth radio signal. For example, the broadcast information is broadcasted via a Bluetooth wireless communication.

The Bluetooth wireless communication may for instance be according to a WPAN (Wireless Personal Area Network) communication enabling such a wireless communication connection in a broadcasting manner. Thus, the broadcast information may for instance be transmitted via one or more broadcasts regardless whether or not another device may receive the transmitted broadcast in formation.

According to an exemplary embodiment of the first exemplary aspect of the present invention, the broadcast information is broadcasted periodically.

The broadcast information may for instance be broadcasted repeatedly, e.g. after the lapse of a pre-defined time interval. Further, in case more than one information, or one information e.g. represented by more than one advertisement packet, the more than one advertisement packet may for instance be broadcasted, and after the lapse of the pre-defined time interval, the more than one advertisement packets may for instance be broadcasted again.

According to an exemplary embodiment of the first exemplary aspect of the present invention, the first method is performed and/or controlled upon obtaining a request for performing and/or controlling the first method.

The request may for instance be obtained by receiving the request from an entity, e.g. a server or a mobile device. Further, the request may for instance be obtained by receiving the request via user input. After such a request is obtained, the request may for instance trigger a scanning for obtaining the broadcast information broadcasted, e.g. by the first apparatus. Thus, such a request may for instance be obtained by an entity that is different from the at least one first apparatus.

Further, the at least one first apparatus may be triggered by the request for performing and/or controlling the first method according to the first exemplary aspect of the present invention. For instance, based on such a trigger, the determining of the one or more identifier information, and additionally the determining of the one or more signal strength values, and the broadcasting (e.g. transmission) of the broadcast information (e.g. via a BT- or BLE-advertisement packet comprising those information) may be performed and/or controlled.

According to an exemplary embodiment of all exemplary aspects of the present invention, the data packet comprises at least a payload part, wherein the payload part comprises one or more identifier information representations, wherein each of the one or more identifier information representations at least partially represents one respective identifier information of the determined one or more identifier information of the one or more beacon devices.

The data packet may for instance carry a Unique Universal Identifier (UUID). In particular, such a UUID may for instance be carried by a BT- or BLE-advertisement packet.

The payload part may for instance be a payload information, wherein the payload information may for instance be customizable.

Optionally, the data packet may for instance further comprise a header part.

According to an exemplary embodiment of all exemplary aspects of the present invention, the payload part may only contain a pre-determined number of identifier information representations, and wherein broadcasting or triggering broadcasting of further identifier information representations is enabled by a paging mechanism.

For instance, in case a part of the one or more identifier information representations cannot be contained by the payload part, the part that is not containable may for instance be contained by another data packet. This may for instance be enabled by a paging mechanism. Further, a paging mechanism may be enabled with e.g. three bytes of the of the data packet (e.g. carried by the header part; use a first byte to carry a page number, a second byte to carry a total number of pages and a third byte to describe a measurement running serial number) to carry more information via a plurality of such data packets. One or more bytes (e.g. three bytes) of the header part of the data packer may for instance enable such a paging mechanism.

Further, the payload part may for instance be expanded, e.g. by reducing the length of the header part. For instance, to comprise all of the intended payload information (e.g. the one or more identifier information representations of the one or more beacon devices, and additionally one or more signal strength value representations), one or more bits of the header part, e.g. which may not be needed to enable the paging mechanism, may be at least partially used for the intended payload information. It will be understood that the usage of the header part may only be possible in case the part of the intended payload information that cannot be carried by the payload part is equal or shorter than those one or more bits of the header part that may not be needed to enable the paging mechanism.

For instance, one or more bits of the header part may be overwritten in case those one or more bits are not needed for carrying e.g. the three bytes associated with a paging mechanism.

Additionally or alternatively, the intended payload information may for instance be reduced in its length. For instance, the one or more identifier information representations, and optionally the one or more signal strength value representations may for instance be reduced. The one or more identifier information representations and optionally the one or more signal strength value representations may for instance be reduced by shortening at least one of the respective representations.

For instance, in case of more than one identifier information representations, which may additionally be accompanied by more than one signal strength value representations, one of such an identifier information representation, additionally accompanied by one of such a signal strength value representation may be broadcasted by being carried by a first data packet. Another single determined identifier information representation, and additionally another single signal strength value representation may then for instance be broadcasted by another data packet.

For instance, one identifier of a respective beacon device, and additionally one signal strength value, as corresponding representations, are broadcasted by one broadcast information, e.g. carried by a BT-, or BLE-advertisement packet, and another identifier of a respective beacon device, and additionally another signal strength value, as other corresponding representations, are broadcasted by another information, e.g. carried by another BT-, or BLE-advertisement packet, wherein both broadcast information are broadcasted by the same first apparatus.

According to an exemplary embodiment of all exemplary aspects of the present invention, wherein the identifier information representation is non-unique, and/or wherein each identifier information representation of the one or more identifier information representations only represents a part of the respective identifier information of the determined one or more identifier information of the beacon devices.

According to an exemplary embodiment of all exemplary aspects of the present invention, each identifier information representation of the one or more identifier information representations requires less bits than the respective identifier information of the determined one or more identifier information of the one or more beacon devices.

According to an exemplary embodiment of all exemplary aspects of the present invention, the payload part further comprises one or more signal strength value representations, wherein each of the one or more signal strength value representations at least partially represents one respective signal strength value of one or more signal strength values at least partially determined on the one or more beacon signals.

According to an exemplary embodiment of all exemplary aspects of the present invention, each of the one or more signal strength value representations requires less bits in case the resolution of each of the one or more signal strength representations is reduced.

The one or more identifier information, and optionally the one or more signal strength value representations may for instance be of a short length (e.g. one hexadecimal number, 4 bits or even shorter), in particularly shorter than the respective identifier information of the determined one or more identifier information of the one or more beacon devices. The less bits are used for each of the one or more identifier information representations, the more ambiguity there may be. Further, the one or more signal strength value may for instance be represented by the respective signal strength representation, e.g. by 6 bits (e.g. a signal strength range from −30 to −90 dBm equaling a range of 60 dB). In the case of 6 bits length for a respective signal strength value representation, those 6 bits may be sufficient for enabling the data packet to carry the respective signal strength value representation in a resolution of one dB. In case a resolution of two dB is sufficient, the respective signal strength value representation may for instance be represented by 5 bits (60 dB range at two dB resolution equals 30 possible values, thus 5 bits).

In case the identifier information of one or more of the one or more beacon devices is a UUID, only a part of the complete UUID of the respective beacon device of the one or more beacon devices may for instance be contained by the data packet. The length of a complete UUID of such a respective beacon device may for instance differ dependent upon the specification of the beacon device. For instance, the UUID of a respective beacon device according to the Eddystone-specification may for instance be represented by 16 bytes. The UUID of a respective beacon device according to the iBeacon-specification may for instance be represented by 20 bytes (e.g. 16 bytes UUID, 2 bytes Major ID and 2 bytes Minor ID). Thus, by shortening the identifier information e.g. to the first or last 1, 2, or 3 bytes (to name but a few non-limiting examples) of the identifier information (e.g. the UUID of the respective beacon device), and e.g. using the shortened identifier information as a respective identifier information representation, the data packet can carry a greater number of pieces of identifier information of respective beacon devices as identifier information representations of the one or more beacon devices.

For instance, for broadcasting ten identifiers of ten of the one or more beacon devices, and additionally ten signal strength values (e.g. measured) may for instance require 170 bytes (16 bytes UUID+1 byte payload information (e.g. one signal strength value)*10 beacon devices=170 bytes).

By shortening the identifier information e.g. to 3 bytes, e.g. for broadcasting ten of the corresponding identifier information representations, and additionally ten signal strength values (e.g. measured) may for instance require only 40 bytes (3 bytes shortened UUID+1 byte payload information (e.g. one signal strength value)*10 beacon devices=40 bytes).

In case one data packet of e.g. a pre-defined format (e.g. according to BT-, or BLE communication standard) is able to carry the one or more identifier information representations, and additionally the one or more signal strength value representations in a single data packet (e.g. a single BT-, or BLE advertisement packet), such a single data packet may for instance be broadcasted.

In case one data packet of e.g. a pre-defined format (e.g. according to BT-, or BLE communication standard) is not able to carry the one or more identifier information representations of the one or more beacon devices, and additionally the one or more signal strength value representations in a single information (e.g. a single BT-, or BLE advertisement packet), then the one or more identifier information representations of the one or more beacon devices, and additionally the one or more signal strength value representations may for instance be broadcasted by more than one data packet (e.g. more than one BT, or BLE advertisement packets), e.g. using the paging mechanism.

According to an exemplary embodiment of the first exemplary aspect of the present invention, the at least one first apparatus is or is part of a tag-device.

According to an exemplary embodiment of the first exemplary aspect of the present invention, the at least one first apparatus does not comprise or is not connected to a user interface and/or does not comprise or is not connectable to a display or a combination thereof. For example, the at least one first apparatus does not comprise or is not connected to a user interface, and/or does not comprise or is connectable to a display.

Such a device, at hand the at least one first apparatus, that does not comprise or is connectable to a user interface and/or a display may for instance be a tag-device, as described above. In particular, such a device may for instance be a BT- or BLE-tag-device. A BT- or BLE-tag-device may for instance be a tag-device according to BT-, or BLE-communication standard.

The at least one second apparatus may for instance be an electronic device, e.g. a mobile device. The mobile device may for instance be portable (e.g. weigh less than 5, 4, 3, 2, or 1 kg). The mobile device may for instance comprise or be connectable a display for displaying a route that is guided/navigated to a user. The mobile device may for instance comprise or be connectable to means for outputting sound, e.g. in form of spoken commands or information. The mobile device may for instance comprise or be connectable to one or more sensor for determining the devices position, such as for instance a Global Navigation Satellite System (GNSS) receiver, e.g. in the form of a Global Positioning System (GPS) receiver. The mobile device may for instance comprise or be connectable to one or more sensors, e.g. in the form of an accelerometer and/or a gyroscope for obtaining information. The mobile device may for instance comprise or be connectable a receiver and/or a transmitter (e.g. a transceiver) for receiving and/or sending information, e.g. broadcasted by a first apparatus (e.g. tag-device). Based on the obtained information, the at least one position of the first apparatus (e.g. from that apparatus the broadcast information is obtained (e.g. received) can be determined. The mobile device may for instance be suitable for outdoor and for indoor navigation respectively positioning or for indoor navigation respectively positioning.

Alternatively, the at least one second apparatus may for instance be a server, or a server cloud. The server, or the server cloud may for instance be configured to provide one or more radio maps, and/or indoor positioning and/or floor detection services (e.g. in the venue).

Alternatively, in an exemplary embodiment according to the second exemplary aspect of the present invention, the second method may for instance be performed and/or controlled by at least one mobile device and a server (or a server cloud).

The at least one second apparatus, e.g. of the venue, may for instance be one of the at least two devices taking part in a communication. The other device of the at least two devices taking part in such a communication in the venue may for instance be another entity, e.g. a radio map and positioning server. The radio map and positioning server may for instance comprise or be connectable to a transceiver, e.g. according to the BT-, BLE, and/or WLAN-specification to provide wireless-based communication. In the aforementioned case, one or more embodiments according to the second exemplary aspect of the present invention may for instance be performed and/or controlled by at least one second apparatus and the another entity, e.g. the radio map and positioning server.

The broadcast information may for instance be obtained by receiving the broadcast information, wherein prior to receiving the broadcast information, the broadcast information is broadcasted, e.g. by a first apparatus.

The position may for instance be determined or triggered to be determined of an entity (e.g. first apparatus), wherein the broadcast information is obtained from the entity. Thus, the position of the entity from which the obtained position stems, is determined or triggered to be determined.

For instance, the at least one second apparatus scans a radio environment of the venue for signals of first apparatuses, e.g. tag-devices (e.g. BT-, or BLE-tag-devices). These may be signals on certain frequency channels that are known to be used by tag-devices for broadcasting advertising packets. The at least one second apparatus extracts information in advertising packets conveyed by the detected signals, including one or more identifier information of respective beacon devices in the venue.

Next, the at least one second apparatus assembles a positioning request. The positioning request includes for each beacon device of which signals conveying advertising packets were detected, the extracted identifier information, and additionally the determined RSSI in case the RSSI is represented by the obtained information.

Such a positioning request may for instance be provided (e.g. sent) to a server, e.g. a radio map and positioning server. Upon receiving the positioning request, the server may for instance determine the position of the first apparatus from that the broadcast information were obtained by the at least one second apparatus. Then, after the determining of the position, the determined position may be transmitted to the at least one second apparatus that requested the position to be determined by the positioning request.

According to an exemplary embodiment of the second exemplary aspect of the present invention, the broadcast information further comprises or represents one or more signal strength values, wherein the determining of the position of the at least one first apparatus is further at least partially based on the one or more signal strength values.

The one or more signal strength values may for instance be the same as described above with respect to the one or more signal strength values as used by exemplary embodiments of the method according to the first exemplary aspect of the present invention.

According to an exemplary embodiment of the second exemplary aspect of the present invention, the position is determined further at least partially based on a radio map, wherein in particular the position is estimated by a comparison of the one or more signal strength values with those of the radio map.

Indoor positioning and/or floor detection may for instance be performed and/or controlled based on such a radio map.

Such a radio map may be understood to represent an area of a pre-determined environment within which the one or more beacon devices are expected to support e.g tag-devices to get their positions estimated. Additionally or alternatively, the radio map may be defined by an environment and/or an area within which the one or more beacon devices are capable to support e.g. mobile devices to estimate their positions.

The (e.g. expected) radio coverage associated with the one or more beacon devices may describe (e.g. define) the area within which a radio signal (e.g. the one or more beacon signals sent by the one or more beacon devices) transmitted or triggered to be transmitted by the one or more beacon devices are (e.g. expected to be) observable (e.g. receivable with a minimum quality).

For instance, the radio map may contain or represent a respective radio coverage model for each beacon device of the one or more beacon devices. Therein, a radio coverage model for a respective beacon device may for instance be understood to represent the expected radio coverage associated with this beacon device.

Based on the radio map, it may for instance be determined, whether certain identifier information of the one or more beacon devices are expected to be observable. For instance, the radio map may comprise information indicative of any position within the coverage area covered by the radio map at which (e.g. different) beacon signals or a number of different beacon signals are expected to be observable. Such information may for instance be gathered, and then a corresponding radio map comprising the gathered information may be generated.

The radio map may for instance be provided for use by one or more mobile devices to estimate their positions at least partially based on this radio map. A radio map may represent an estimate of a two-dimensional or a three-dimensional coverage map. It may describe (e.g. define) the expected radio coverage of a respective beacon device of the one or more beacon devices within which a beacon signal transmitted or triggered to be transmitted by the beacon device (e.g. installed at an installation position) is expected to be observable. The real radio coverage of the beacon device may however deviate from such an expected radio coverage.

A radio coverage model may be a hard-boundary or a soft-boundary model (e.g. a hard-boundary model or a soft-boundary model describing an expected radio coverage).

An example for a soft-boundary radio coverage model may be a parametric radio model. Data of such a parametric radio model may be considered to be data which enable determination of one or more characteristics of one or more beacon signals transmitted or triggered to be transmitted by a respective beacon device of the one or more beacon devices that are expected to be observable at different positions. For example, data of such a parametric radio model may represent radio transmission parameters of the parametric radio model. Using radio transmission parameters of the parametric radio model may have the effect that the required amount of data for defining the one or more characteristics of one or more beacon signals may be particularly small. An example of a parametric radio model is a path loss model for radio signals (e.g. beacon signals) transmitted or triggered to be transmitted by a respective beacon device of the one or more beacon devices. In this case, the radio transmission parameters may comprise a path loss exponent and an indication of a transmission power used by the transmitter of the respective beacon device of the one or more beacon devices. Based on data of a parametric radio model an expected radio coverage of a respective beacon device of the one or more beacon devices installed at a (potential) installation position may be determined.

Radio transmission parameters of a parametric radio model of a respective beacon device of the one or more beacon devices may be at least partially determined (e.g. derived or selected or calculated) at least partially based on one or more observation reports. For example, the radio transmission parameters of a parametric radio model of a radio positioning support device may at least partially correspond to and/or determined based on one or more radio transmission parameters associated with this beacon device of the one or more beacon devices, wherein the one or more radio transmission parameters associated with this beacon device of the one or more beacon devices may for example be represented by and/or contained in the one or more observation reports (e.g. one or more observation reports associated with the beacon device and/or an (e.g. adjacent) beacon device of the one or more beacon devices).

In case different values are determined for a radio transmission parameter based on one or more radio transmission parameters represented by and/or contained in the one or more observation reports, a mean value (e.g. an arithmetic mean value or a median mean value) may for example be used as value for this radio transmission parameter. Alternatively, one value of the different values may be selected according to a pre-determined rule to be used for as value for this radio transmission parameter (e.g. the lowest or highest value may be used as value for this radio transmission parameter).

As disclosed above, an indication of a transmission power of a beacon device of the one or more beacon devices and an indication of one or more (received) signal strength values for a beacon signal of the one or more beacon signals may be referred to as radio transmission parameters. A radio transmission parameter may be understood to be associated with a beacon device of the one or more beacon devices if the radio transmission parameter describes a feature (e.g. a physical quantity) of a radio signal (e.g. a beacon signal of the one or more beacon signals) transmitted or triggered to be transmitted by this beacon device, for example if the radio transmission parameter indicates a transmission power of this beacon device and/or if the radio transmission parameter indicates a (received) signal strength value for a beacon signal transmitted or triggered to be transmitted by this beacon device of the one or more beacon devices.

If the installation positions of the one or more beacon devices and, thus, also the distances between the one or more beacon devices are known, such radio transmission parameters associated with a beacon device of the one or more beacon devices may for example be used to determine (e.g. calculate) further radio transmission parameters for a parametric radio model like e.g. a path loss exponent.

An example for a hard-boundary radio coverage model may be a geometric model. Data of such a geometric radio model may be considered to be data which (e.g. geometrically) describe (e.g. define) an expected radio coverage of a beacon device of the one or more beacon device (e.g. installed at an installation position).

For instance, a terrestrial transmitter (e.g. comprised by or represented by a beacon device of the one or more beacon devices) based positioning at a particular site (e.g. in the venue) may be based on radio maps, which allow determining for instance which received signal strength values of which transmitters can be expected at various locations of the particular site.

For making use of a positioning service, a first apparatus (e.g. a tag-device) may detect signals broadcast by a plurality of beacon devices and measure their signal strengths. The first apparatus may broadcast the results of the measurements along with identifier information of the beacon devices (e.g. by one or more BT- or BLE-advertisement packets) to the second apparatus, e.g. a radio map and positioning server. An identifier may be for instance in the form of a service set identifier (SSID), a universally unique identifier (UUID) (e.g. according to Eddystone- or iBeacon-specification) and the results of measurements may be for instance in the form of a received signal strength indicator (RSSI). The radio map and positioning server may evaluate the signals taking account of data stored in radio maps and returns a position (e.g. in the form of coordinates) that are consistent with the measured signal strengths of the plurality of beacon devices.

According to an exemplary embodiment of the second exemplary aspect of the present invention, the radio map is obtained prior to the determining or triggering determining of the position of the at least one first apparatus.

The radio map may for instance be obtained (e.g. received) from a radio map and positioning server. After the radio map is obtained, the entity (the at least one second apparatus) that obtained the radio map may for instance determine the position. In contrast to the previous exemplary embodiment, the position is determined locally, and not triggered to be determined, e.g. from the radio map and positioning server.

According to an exemplary embodiment of the second exemplary aspect of the present invention, the position is determined based on a triangulation (e.g. triangular direction finding), wherein based on the one or more identifier information a respective location of each of the one or more beacon devices is determined, and the position is estimated based on the one or more identifier information observable at the position and the determined respective locations of the one or more beacon devices.

The position may for instance be determined by a triangulation, in particular a triangular direction finding process. The position of the first apparatus may for instance be determined based on signals from the one or more beacon devices, wherein the position of said beacon devices may for instance be known, or determined based on the one or more identifier information of the one or more beacon devices. Then, the position of the first apparatus may for instance be determined via a triangulation based on the known positions of the one or more beacon devices.

According to an exemplary embodiment of the second exemplary aspect of the present invention, the position may for instance be determined based on a statistical likelihood comparison. For instance, a comparison may be performed between the determined signal strength value (e.g. RSS-measurement) and those values of the radio map. Further processes to determine the position based on a radio map may for instance be possible.

According to an exemplary embodiment of the second exemplary aspect of the present invention, the determining of the position is triggered by requesting the determining of the position from a positioning service.

The determining of the position may for instance be triggered as a service provided by the positioning service. Such a positioning service may for instance be provided e.g. by an entity that is different from the at least one second apparatus, e.g. a radio map and positioning server, as described above.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
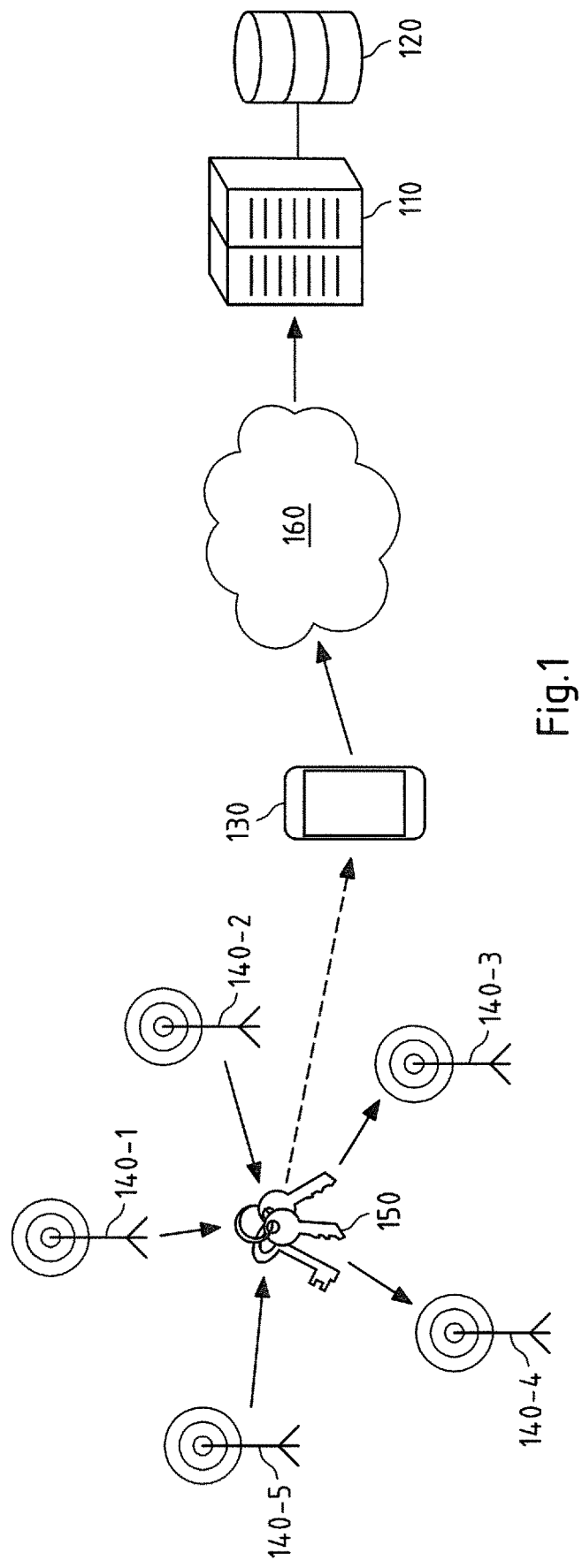
FIG. 1 a schematic block diagram of a system according to the third exemplary aspect of the present invention.

FIG. 1 is a schematic high-level block diagram of a system 100 according to an exemplary aspect of the present invention. Such a system 100 may for instance represent a generic system architecture as used by one or more exemplary embodiments according to all exemplary aspects of the present invention.

System 100 comprises a server 110, a database 120, one or more mobile devices, at hand a single mobile device 130 (e.g. a smartphone, tablet, portable navigation device, IoT (Internet of Things) device to name but a few non-limiting examples), one or more beacon devices 140, e.g. radio nodes 140-1 to 140-5, which are embodied as beacons at hand, one or more tag-devices, at hand a single tag-device 150, and a communication network 160. One or more of the aforementioned entities of the system 100 may for instance be comprised (e.g. installed and/or located) in a venue.

The server 110 may alternatively be embodied as a server cloud (e.g. a plurality of servers connected, e.g. via the Internet (e.g. comprised by communication network 160) and providing services at least partially jointly). The server 110, which may for instance be embodied as a monitoring respectively management server for the beacon devices 140, may for instance be further configured to provide radio maps and positioning services (e.g. indoor positioning and/or floor detection services), e.g. to one or more mobile devices, e.g. mobile device 130. Further, the one or more beacon devices 140 may for instance be embodied as one or more IoT devices. The server 110 may be connected to the mobile device 130 e.g. via the internet or via a wirebound or wireless communication connection (e.g. according to the Wi-Fi, BT, and/or BLE communication standard), e.g. represented in FIG. 1 by the communication network 160.

The database 120 may for instance be optional. The database 120 may for instance be comprised by or connectable to the server 110. The database 120 may for instance comprise a memory, e.g. for storing one or more radio maps, and/or one or more positions (e.g. in the form of coordinates) of the beacon devices 140 associated with one or more identifier information of the beacon devices 140. For instance, based on a identifier information of a beacon device 140 (e.g. a SSID, or a MAC address of a respective beacon device 140), the position (e.g. in the form of coordinates, e.g. in the venue) of the respective beacon device 140 may for instance be obtainable from the database 120.

The communication network 160 may for instance be used for transmitting information comprising or representing one or more determined identifier information of the beacon devices 140 (see step 201, step 202 of FIG. 2, and step 301 of FIG. 3) between the tag-device 150 and the mobile device 130. Alternatively, the broadcast information may for instance be transmitted from the tag-device 150 to the mobile device 130 via a direct communication, e.g. without a pairing between the two devices (tag-device 150 and mobile device 130) required prior to the transmitting of the broadcast information. This is enabled by a broadcast of the broadcast information by the tag-device 150. The mobile device 130 may for instance obtain the broadcasted information, e.g. by scanning for the broadcast information, e.g. monitoring one or more pre-defined communication channels. The communication channels may for instance be pre-defined by the communication standard used at least partially by the system 100, e.g. the BT- or BLE-communication standard.

Alternatively, the server 110 may for instance be optional. In this case, mobile device 130 may for instance provide the functionalities and/or services, which the server provides in the other alternative embodiment.

The tag-device may for instance be configured to perform and/or control the first method according to the first exemplary aspect of the present invention. Further, the mobile device 130 may for instance be configured to perform and/or control the second method according to the second exemplary aspect of the present invention. Alternatively, the server 110 may for instance be configured to perform and/or control the second method according to the second exemplary aspect of the present invention. Alternatively, the mobile device 130 may for instance be configured, together with the server 110, to perform and/or control the second method according to the second exemplary aspect of the present invention. The tag-device 150, together with the mobile device 130, or with the server 110, or with the mobile device 130 and the server 110 may for instance be configured to perform and/or control the first and the second method according to the first and second exemplary aspect of the present invention.

Figure 2:
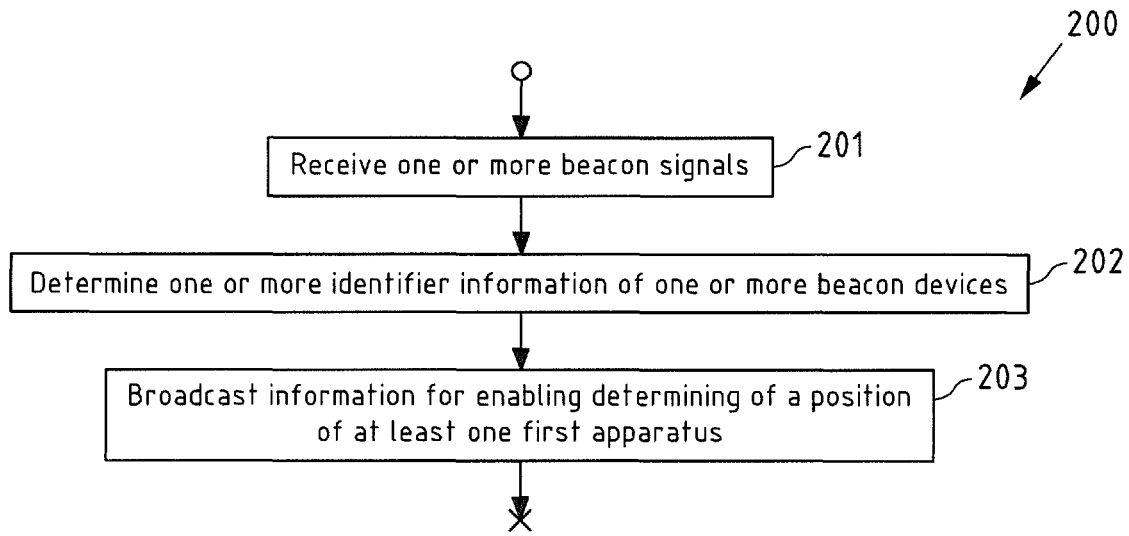
FIG. 2 a flowchart showing an example embodiment of a first method according to the first exemplary aspect of the present invention, for instance performed by tag-device 150 of FIG. 1.

FIG. 2 is a flowchart 200 showing an example embodiment of a method according to the first exemplary aspect of the present invention. This flowchart 200 may for instance be performed by a tag-device (e.g. tag-device 150 of FIG. 1).

In a first step 201, one or more beacon signals are received, e.g. by a first apparatus (e.g. the tag-device 150 of FIG. 1).

In a second step, one or more identifier information of one or more beacon devices (e.g. beacon devices 140 of FIG. 1) are determined.

In a third step 203, broadcast information for enabling a determining of a position of at least one first apparatus is broadcasted (by the tag-device 150 of FIG. 1).

Figure 3:
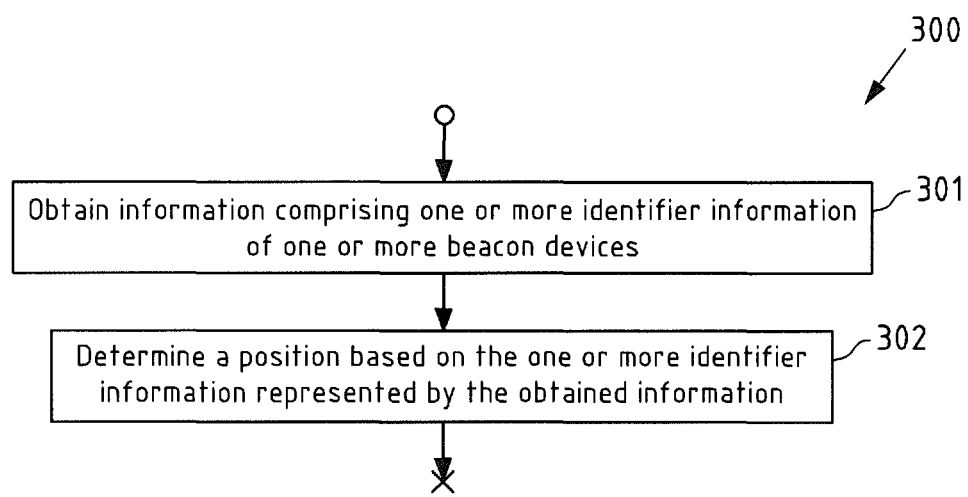
FIG. 3 a flowchart showing an example embodiment of a second method according to the second exemplary aspect of the present invention, for instance performed by mobile device 130 of FIG. 1.

FIG. 3 is a flowchart 300 showing an example embodiment of a method according to the second exemplary aspect of the present invention. This flowchart 300 may for instance be performed by a mobile device (e.g. mobile device 130 of FIG. 1). Alternatively, this flowchart 300 may for instance be performed by a server (e.g. server 110 of FIG. 1). Alternatively, this flowchart 300 may for instance be performed together by a mobile device (e.g. mobile device 130 of FIG. 1) and a server (e.g. server 110 of FIG. 1), wherein the first step 301 may be performed by the mobile device, and the second step 302 may be performed by the server.

In a first step 301, information, e.g. broadcast information, comprising or representing one or more identifier information of one or more beacon devices (e.g. beacon devices 140 of FIG. 1) is obtained (e.g. received). The broadcast information is obtained e.g. from the tag-device 150 of FIG. 1, or another entity that relayed the broadcast information broadcasted by the tag-device 150 of FIG. 1 to the entity performing and/or controlling the flowchart 300.

In a second step 302, a position (e.g. of the tag-device 150 of FIG. 1) is determined. The position (e.g. of the tag-device 150 of FIG. 1) is determined based on the one or more identifier information of the one or more beacon devices 140 of FIG. 1 represented by the broadcast information (see step 301).

Figure 4:
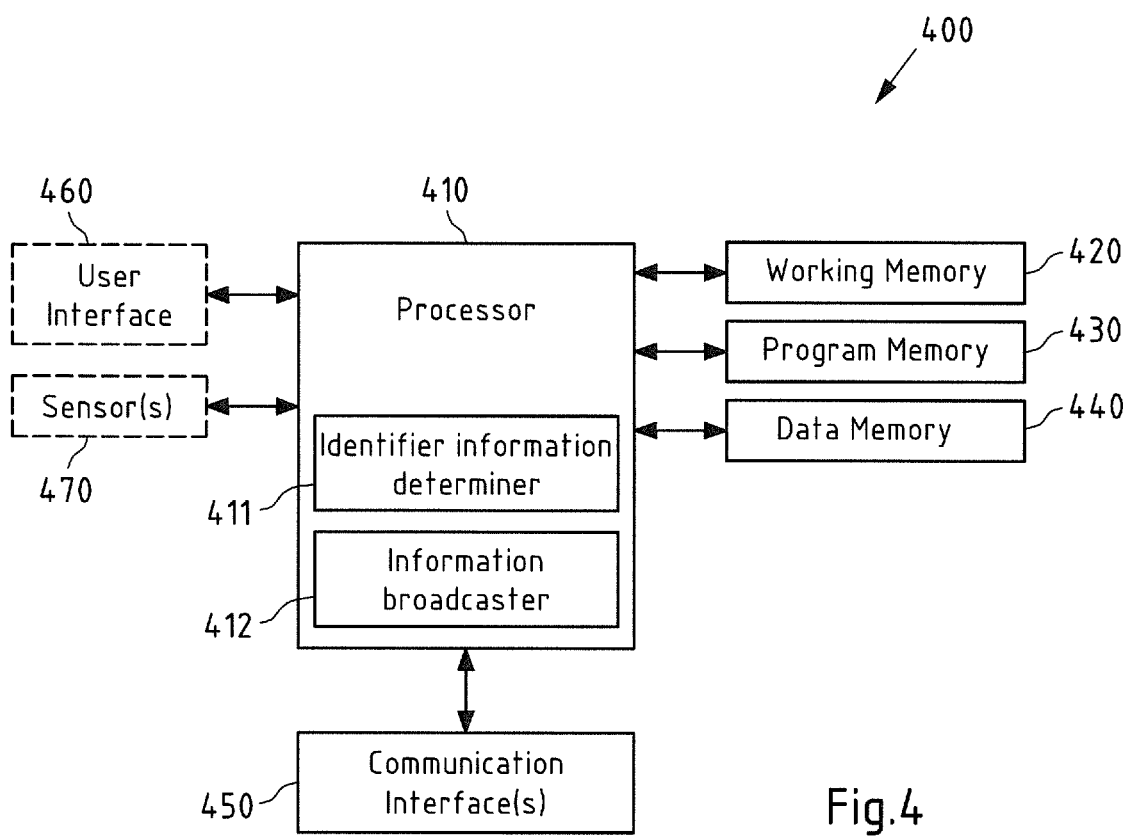
FIG. 4 a schematic block diagram of a first apparatus configured to perform the first method according to the first exemplary aspect of the present invention.

FIG. 4 is a schematic block diagram of an apparatus 400 according to an exemplary aspect of the present invention, which may for instance represent the tag-device 150 of FIG. 1.

Apparatus 400 comprises a processor 410, working memory 420, program memory 430, data memory 440, communication interface(s) 450, an optional user interface 460 and an optional sensor(s) 470.

Apparatus 400 may for instance be configured to perform and/or control or comprise respective means (at least one of 410 to 470) for performing and/or controlling the method according to the first exemplary aspect. Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect of the invention.

Processor 410 may for instance comprise an identifier information determiner 411 as a functional and/or structural unit. Identifier information determiner 411 may for instance be configured to determine one or more identifier information of one or more beacon devices (see step 201 of FIG. 2). Processor 410 may for instance comprise an information broadcaster 412 as a functional and/or structural unit. Information broadcaster 412 may for instance be configured to broadcast information (see step 202 of FIG. 2). Processor 410 may for instance further control the memories 420 to 440, the communication interface(s) 450, the optional user interface 460 and the optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 450 enable apparatus 400 to communicate with other entities, e.g. with server 110 and/or mobile device 130 of FIG. 1. of FIG. 1. The communication interface(s) 450 may for instance comprise a wireless interface, e.g. a cellular radio communication interface and/or a WLAN interface and/or a BT- or BLE interface), for instance to communicate with entities via the Internet. Communication interface(s) may enable apparatus 400 to communicate with other entities, for instance with server 110 or mobile device 130 of FIG. 1.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to gather pressure information.

Some or all of the components of the apparatus 400 may for instance be connected via a bus. Some or all of the components of the apparatus 400 may for instance be combined into one or more modules.

Figure 5:
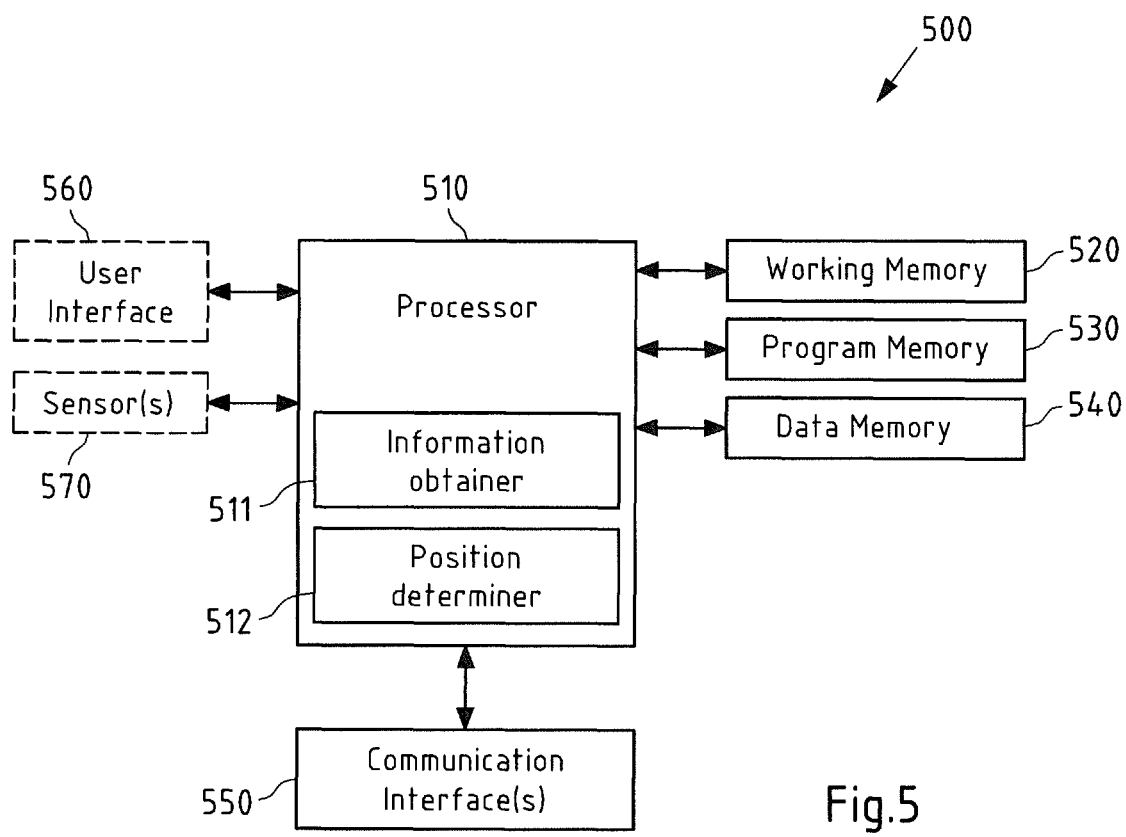
FIG. 5 a schematic block diagram of a second apparatus configured to perform the second method according to the second exemplary aspect of the present invention.

FIG. 5 is a schematic block diagram of an apparatus 500 according to an exemplary aspect of the present invention, which may for instance represent the mobile device 130 of FIG. 1. Alternatively, the schematic block diagram of the apparatus 500 according to an exemplary aspect of the present invention may for instance represent server 110 of FIG. 1.

Apparatus 500 comprises a processor 510, working memory 520, program memory 530, data memory 540, communication interface(s) 550, an optional user interface 560 and an optional sensor(s) 570.

Apparatus 500 may for instance be configured to perform and/or control or comprise respective means (at least one of 510 to 570) for performing and/or controlling the method according to the second exemplary aspect. Apparatus 500 may as well constitute an apparatus comprising at least one processor (510) and at least one memory (520) including computer program code, the at least one memory and the computer program code configured to, with the at least one processor, cause an apparatus, e.g. apparatus 500 at least to perform and/or control the method according to the second exemplary aspect of the invention.

Processor 510 may for instance comprise an information obtainer 511 as a functional and/or structural unit. Information obtainer 511 may for instance be configured to obtain information (see step 301 of FIG. 3). Processor 510 may for instance comprise an position determiner 512 as a functional and/or structural unit. Position determiner 512 may for instance be configured to determine a position, e.g. of the tag device 150 of FIG. 1 (see step 302 of FIG. 3). Processor 510 may for instance further control the memories 520 to 540, the communication interface(s) 550, the optional user interface 560 and the optional sensor(s) 570.

Processor 510 may for instance execute computer program code stored in program memory 530, which may for instance represent a computer readable storage medium comprising program code that, when executed by processor 510, causes the processor 510 to perform the method according to the first exemplary aspect.

Processor 510 (and also any other processor mentioned in this specification) may be a processor of any suitable type. Processor 510 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 510 may for instance be an application processor that runs an operating system.

Program memory 530 may also be included into processor 510. This memory may for instance be fixedly connected to processor 510, or be at least partially removable from processor 510, for instance in the form of a memory card or stick. Program memory 530 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 530 may also comprise an operating system for processor 510. Program memory 530 may also comprise a firmware for apparatus 500.

Apparatus 500 comprises a working memory 520, for instance in the form of a volatile memory. It may for instance be a Random Access Memory (RAM) or Dynamic RAM (DRAM), to give but a few non-limiting examples. It may for instance be used by processor 510 when executing an operating system and/or computer program.

Data memory 540 may for instance be a non-volatile memory. It may for instance be a FLASH memory (or a part thereof), any of a ROM, PROM, EPROM and EEPROM memory (or a part thereof) or a hard disc (or a part thereof), to name but a few examples.

Communication interface(s) 550 enable apparatus 500 to communicate with other entities, e.g. with server 110 and/or tag-device 150 of FIG. 1. The communication interface(s) 550 may for instance comprise a wireless interface, e.g. a cellular radio communication interface and/or a WLAN interface and/or a BT- or BLE interface) and/or wire-bound interface, e.g. an IP-based interface, for instance to communicate with entities via the Internet. Communication interface(s) may enable apparatus 500 to communicate with other entities, for instance with server 110 and/or tag-device 150 of FIG. 1.

User interface 560 is optional and may comprise a display for displaying information to a user and/or an input device (e.g. a keyboard, keypad, touchpad, mouse, etc.) for receiving information from a user.

Sensor(s) 570 are optional and may for instance comprise a barometric sensor, e.g. to gather pressure information.

Some or all of the components of the apparatus 500 may for instance be connected via a bus. Some or all of the components of the apparatus 500 may for instance be combined into one or more modules.

The following exemplary embodiments shall also be considered to be disclosed:

A first device with a Bluetooth radio that can perform measurements on the Bluetooth beacon signals. A method for sending those measurements to the second device using the Bluetooth advertisement packets. A method for capturing those (opportunistically) by the second device (e.g. a mobile phone), and the second device either i) locating the tag locally, or ii) by sending the measurements to the cloud.

There are several advantages in such an approach:
The same radio is used in performing measurements and providing them further.
A tag can be extremely simply, because it only needs a standard Bluetooth radio to send standard Bluetooth advertisement messages. No cellular or Wi-Fi connectivity is required. Also, when advertisement packages are used, the Bluetooth devices do not need to be paired, i.e. any Bluetooth device can simply capture the message. This is the key strength of the invention.
Advertisement packet is a standard message in the Bluetooth standard and hence no proprietary mechanisms need to be developed.
Sending out Bluetooth advertisement packets is very cheap energy-wise, e.g. a small battery (e.g. CR1616; and/or having 55 mAh energy capacity) lasts several years, when such an advertisement packet is sent just once a minute.
Most importantly, no extra hardware (e.g. hubs) or network components are required, as the measurement packets are captured by the mobile device, which locates the tag via the method i) or ii) above. It suffices to set up Bluetooth beacons.

In the present specification, any presented connection in the described embodiments is to be understood in a way that the involved components are operationally coupled. Thus, the connections can be direct or indirect with any number or combination of intervening elements, and there may be merely a functional relationship between the components.

The FIG. 1 shows the generic system architecture. The key ideas are:
The radio environment to support indoor positioning is provided by the Bluetooth beacons.
The object to be located (e.g. keys) has a simple radio tag that measures Bluetooth beacon signals (their beacon IDs and signal strength).
The tag further sends the measurements in the Bluetooth advertisement package to the second device.
The second device (phone in the example of FIG. 1) captures the advertisement package after which the tag is located:
Device can position the tag using the radio map downloaded from the radio map server.
Device can query location from the positioning server by providing the measurements to the server.
How to construct the advertisement message:
The single measurement made of the Bluetooth beacon (e.g. Eddystone) requires:
16-byte UUID
one-byte signal strength measurement
So e.g. carrying measurements for ten beacons would require 170 bytes.

Now, in Bluetooth v4.2, the advertisement packet payload is 31 bytes and in Bluetooth v5.0 the size is 255 bytes. Thus, in the Bluetooth v4.2 the positioning advertisement message could carry e.g. the three last bytes of the UUID and the Rx level. In that way measurements for seven (7) beacons can be transferred in a single message (7*4=28<31). Further, one could add paging mechanism with e.g. three bytes (use the first byte to carry the page number, the second byte to carry total number of pages and the third byte to describe the measurement running serial number) to carry more information. In Bluetooth v5.0 this problem does not exist anymore due to the native mechanism for carrying more data content in the advertisement by offloading data to the Bluetooth data channels.

Note:
There are few ways to implement the broadcast of the measurements. The first is that the tag periodically broadcasts 'non-connectable undirected' advertisement packet with the measurements. The other option is that the tag periodically broadcasts 'Scannable Undirected' packets to let the second device to know about tag's existence. Upon the reception of this package, the second device sends 'Scan Response Request' packet to the tag. Upon the reception, the tag responds with 'Scan Response' that then contains the Bluetooth beacon measurements. In this option the tag could save some power by only making Bluetooth beacon measurements, when needed.

Advantage:

A very simple way of enabling tag-assisted (tag sends measurements to another entity) positioning for small devices. This solves the ever-lasting problem of how to get the tag's location information into the hands of the location information consumers (e.g. car key owners above). The key idea is that the tag location information provided via advertisement messages is potentially capturable by anyone opportunistically—there is no static infrastructure to pick the measurement messages, but capturing is performed by standard mobile devices, when they are nearby the tag. This makes the approach perfect for e.g. private home use.

Further, when using standard advertisement packages, any Bluetooth device can capture those locate the object of interest.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A first method, performed by at least one first apparatus, comprising:

receiving one or more beacon signals sent by one or more beacon devices;

determining one or more identifier information of the one or more beacon devices, wherein the one or more identifier information of the one or more beacon devices are represented by the one or more beacon signals; and broadcasting or triggering broadcasting broadcast information for enabling determining of a position of the at least one first apparatus based at least partially on the determined one or more identifier information of the one or more beacon devices, wherein the broadcast information at least partially comprises one or more identifier information representations that each at least partially represent a respective identifier information of a respective beacon device of the determined one or more identifier information of the one or more beacon devices, wherein each identifier information representation of the one or more identifier information representations requires less bits than the respective identifier information of the determined one or more identifier information of the one or more beacon devices.

2. The first method according to claim 1, further comprising:

determining one or more signal strength values at least partially based on the one or more beacon signals;

wherein the broadcast information further at least partially comprises or represents the determined one or more signal strength values.

3. The first method according to claim 1, wherein the broadcast information is carried by or is part of a data packet, wherein the data packet comprises at least a payload part, wherein the payload part comprises the one or more identifier information representations.

4. The first method according to claim 3, wherein the payload part contains a pre-determined number of identifier information representations, and wherein broadcasting or triggering broadcasting of further identifier information representations is enabled by a paging mechanism.

5. The first method according to claim 3, wherein at least one of (a) the identifier information representation is non-unique, or (b) each identifier information representation of the one or more identifier information representations only represents a part of the respective identifier information of the determined one or more identifier information of the beacon devices.

6. The first method according to claim 3, wherein the payload part further comprises one or more signal strength value representations, and wherein each of the one or more signal strength value representations at least partially represents one respective signal strength value of one or more signal strength values at least partially determined on the one or more beacon signals.

7. The first method according to claim 6, wherein each of the one or more signal strength value representations requires less bits in case the resolution of each of the one or more signal strength representations is reduced.

8. A second method, performed by at least one second apparatus, comprising:

obtaining broadcast information for enabling determining of a position of at least one first apparatus, wherein the broadcast information at least partially comprises or represents one or more identifier information of one or more beacon devices, wherein an identifier information enables one of the one or more beacon devices to be identified; and determining or triggering determining a position of the at least one first apparatus based on the one or more identifier information carried by the obtained broadcast information, wherein the position is determined based on a statistical likelihood comparison, and wherein a comparison is performed between the determined signal strength value and those values of the radio map.

9. The second method according to claim 8, wherein the broadcast information further at least partially comprises or represents one or more signal strength values;

wherein the determining of the position of the at least one first apparatus is further at least partially based on the one or more signal strength values.

10. The second method according to claim 9, wherein the position is determined further at least partially based on a radio map, and wherein the radio map is obtained prior to the determining or triggering determining of the position of the at least one first apparatus.

11. The second method according to claim 8, wherein the position is determined based on a triangulation, wherein based on the one or more identifier information a respective location of each of the one or more beacon devices is determined, and the position is estimated based on the one or more identifier information observable at the position and the determined respective locations of the one or more beacon devices.

12. The second method according to claim 8, wherein the broadcast information is carried by or is part of a data packet, wherein the data packet comprises at least a payload part, wherein the payload part comprises one or more identifier information representations, and wherein each of the one or more identifier information representations at least partially represents one respective identifier information of the determined one or more identifier information of the one or more beacon devices.

13. The second method according to claim 12, wherein the payload part contains a pre-determined number of identifier information representations, and wherein obtaining of further identifier information representations is enabled by a paging mechanism.

14. The second method according to claim 12, wherein the identifier information representation is non-unique, and/or wherein each identifier information representation of the one or more identifier information representations only represents a part of the respective identifier information of the determined one or more identifier information of the beacon devices.

15. The second method according to claim 12, wherein each identifier information representation of the one or more identifier information representations requires less bits than the respective identifier information of the determined one or more identifier information of the one or more beacon devices.

16. The second method according to claim 12, wherein the payload part further comprises one or more signal strength value representations, and wherein each of the one or more signal strength value representations at least partially represents one respective signal strength value of one or more signal strength values at least partially determined on the one or more beacon signals.

17. The second method according to claim 16, wherein each of the one or more signal strength value representations requires less bits in case the resolution of each of the one or more signal strength representations is reduced.

18. A first apparatus comprising at least one processor and at least one memory including computer program code, the at least one memory and the computer program code configured to, with the at least one processor, cause the first apparatus to at least:

receive one or more beacon signals sent by one or more beacon devices;

determine one or more identifier information of the one or more beacon devices, wherein the one or more identifier information of the one or more beacon devices are represented by the one or more beacon signals; and broadcast or trigger broadcasting broadcast information for enabling determining of a position of the at least one first apparatus based at least partially on the determined one or more identifier information of the one or more beacon devices, wherein the broadcast information at least partially comprises one or more identifier information representations that each at least partially represent a respective identifier information of a respective beacon device of the determined one or more identifier information of the one or more beacon devices, wherein at least one of (a) an identifier information representation of the one or more identifier information representations is non-unique, or (b) each identifier information representation of the one or more identifier information representations only represents a part of the respective identifier information of the determined one or more identifier information of the beacon devices.

* * * * *